United States Patent
Watt et al.

(10) Patent No.: US 9,533,309 B2
(45) Date of Patent: Jan. 3, 2017

(54) LIFTER BAR WITH ATTACHMENT POINT FOR HOISTING

(75) Inventors: Daniel Watt, Secret Harbour (AU); Evert Lessing, The Ponds (AU)

(73) Assignee: Weir Minerals Australia Ltd., New South Wales (AU)

( * ) Notice: Subject to any disclaimer, the term of this patent is extended or adjusted under 35 U.S.C. 154(b) by 581 days.

(21) Appl. No.: 13/994,231

(22) PCT Filed: Dec. 14, 2011

(86) PCT No.: PCT/AU2011/001617
§ 371 (c)(1),
(2), (4) Date: Jul. 3, 2013

(87) PCT Pub. No.: WO2012/079123
PCT Pub. Date: Jun. 21, 2012

(65) Prior Publication Data
US 2013/0299617 A1    Nov. 14, 2013

(30) Foreign Application Priority Data

Dec. 14, 2010  (AU) ................................ 2010905477
Sep. 13, 2011  (AU) ................................ 2011903734

(51) Int. Cl.
| B02C 17/22 | (2006.01) |
| B02C 17/18 | (2006.01) |
| B29C 43/18 | (2006.01) |
| B66C 1/66  | (2006.01) |

(52) U.S. Cl.
CPC ......... *B02C 17/1825* (2013.01); *B02C 17/225* (2013.01); *B29C 43/18* (2013.01); *B66C 1/66* (2013.01); *Y10T 29/49826* (2015.01)

(58) Field of Classification Search
CPC .... B02C 17/1825; B02C 17/225; B02C 17/22; B66C 1/66; B29C 43/18; Y10T 29/49826
USPC ......................................................... 241/183
See application file for complete search history.

(56) References Cited

U.S. PATENT DOCUMENTS

| 2,634,156 A | 4/1953  | Crimmel |
| 4,014,151 A | 3/1977  | Erhart  |
| 4,052,014 A | 10/1977 | Jonsson |
| 4,394,982 A | 7/1983  | Wilson  |
| 4,424,938 A | 1/1984  | Day     |
| 4,460,210 A | 7/1984  | Miechur |

(Continued)

FOREIGN PATENT DOCUMENTS

| AU | 695779 B2    | 8/1998 |
| AU | 200053388 A1 | 2/2001 |

(Continued)

OTHER PUBLICATIONS

Australian Search Report for Patent Application No. 2013202639 dated May 26, 2016, 4 pgs.

(Continued)

*Primary Examiner* — Mark Rosenbaum
(74) *Attorney, Agent, or Firm* — Gardere Wynne Sewell LLP

(57) ABSTRACT

A lifter bar includes at least one attachment formation for use in lifting the lifter bar; wherein the at least one attachment formation is embedded in the lifter bar. A method of producing the lifter bar and tools for use in handling the lifter bar are also described.

11 Claims, 10 Drawing Sheets

(56) References Cited

U.S. PATENT DOCUMENTS

| | | |
|---|---|---|
| 4,848,681 A | 7/1989 | Eriksson et al. |
| 2010/0127109 A1 | 5/2010 | Moller et al. |
| 2011/0186670 A1* | 8/2011 | Town .................. B02C 17/225 |
| | | 241/182 |
| 2013/0105609 A1* | 5/2013 | Fernandez ............ B02C 17/225 |
| | | 241/83 |

FOREIGN PATENT DOCUMENTS

| | | |
|---|---|---|
| CN | 201338904 Y | 11/2009 |
| EP | 0967347 A1 | 12/1999 |
| EP | 1181981 A1 | 2/2002 |
| GB | 240124 A | 11/1925 |
| WO | WO-9300997 A1 | 1/1993 |
| WO | WO-2011/130781 A1 | 10/2011 |
| WO | WO-2012/079123 A2 | 6/2012 |

OTHER PUBLICATIONS

Chinese Search Report for Patent Application No. 2014105973445 dated Mar. 24, 2016, 2 pgs.
International Preliminary Report on Patentability in PCT/AU2011/001617, dated Apr. 2, 2013.
International Search Report in PCT/AU2011/001617, dated Jun. 25, 2012.
Written Opinion in PCT/AU2011/001617, dated Jun. 25, 2012.

* cited by examiner

LIFTER BAR WITH ATTACHMENT POINT FOR HOISTING

TECHNICAL FIELD

This disclosure relates to lifter bars for use in crushing mills, methods of producing lifter bars and to tools for use in hoisting lifter bars which have particular application in mineral processing, power generation and general industrial crushing operations.

BACKGROUND

A typical grinding mill comprises a generally cylindrical drum with openings at one or both ends of the drum. Spaced about the inside wall of the drum are a number of lifter bars which are elongate objects which stand proud of the inner drum surface. The material to be ground is introduced to the drum along with grinding media in the form of a number of steel balls. The drum is caused to rotate and, as it does so, the lifter bars serve to lift the material and grinding media as the drum rotates, rather than merely sliding along the inside wall of the drum. At a certain point in the rotation of the drum, the material and grinding media falls away from the lifter bar by action of gravity to impact at the lower region of the drum. The force of the impact causes the material to be broken into smaller pieces thus effecting a grinding action.

The lifter bars become worn during operation of the mill and have a limited service life. It is necessary to replace the lifter bars from time to time. The lifter bars can weigh of the order of 200 kg, and often the openings at the ends of the drum through which the lifter bars must pass provide very limited clearance.

There remains a need for improvements to ease the process of installation and removal of lifters bars into and out of a grinding mill.

SUMMARY OF THE DISCLOSURE

In a first aspect the present invention provides a lifter bar including: at least one attachment formation for use in lifting the lifter bar; wherein the at least one attachment formation is embedded in the lifter bar.

The lifter bar may include at least two attachment formations that are located on either side of the centre of gravity of the lifter bar.

The lifter bar may include a single attachment formation which is provided at a point along the length of the lifter bar which coincides with the centre of gravity of the lifter bar.

The at least one attachment formation may include a shank portion and an enlarged head portion.

The head portion may extend radially beyond the shank portion substantially about the entire circumference of the shank portion.

The at least one attachment formation may further include at least one anchor portion attached to the shank portion.

The anchor portion may include a generally planar portion which lies in a plane substantially orthogonal to the axis of the shank portion.

The at least one attachment formation may be disposed on the trailing face of the lifter bar.

In a second aspect there is provided a lifter bar including: at least one attachment formation; and wherein the attachment formation is embedded into the lifter bar.

In a third aspect there is provided a method of producing a lifter bar including the steps of: preparing a mould for forming the lifter bar; introducing elastomeric material into the mould; introducing at least one attachment formation into the mould; and curing the elastomeric material to form the lifter bar.

The method may further include the step of providing a slot in the mould which receives a portion of the attachment formation to locate the attachment formation in a desired position during production of the lifter bar.

The attachment formation may include a sealing portion which cooperates with the slot in the mould to inhibit the ingress of elastomeric material into the slot during production of the lifter bar.

The attachment formation may include a locating lug which cooperates with the slot to retain the sealing portion of the attachment formation in cooperation with the slot during production of the lifter bar.

In a fourth aspect there is provided a tool for use in hoisting a lifter bar including: at least one capture mechanism for capturing an attachment formation of the lifter bar, the attachment formation including a shank portion and an enlarged head portion; the capture mechanism including a first member having an opening to receive the shank portion of the attachment formation and a second member which is slidably moveable in relation to the first member to a position in which the second member traps the attachment formation in the opening of the first member.

The tool may further include a second capture mechanism.

The second member of the capture mechanism may include a locking formation to lock the second member in the trapping position.

The locking formation may include an aperture which aligns with an aperture in the first member.

The apertures may be arranged to receive a hook to hoist the tool and lifter bar.

In a fifth aspect there is provided a lifting device for use in hoisting a lifter bar including: a capture portion for capturing an attachment formation of the lifter bar, the attachment formation including a shank portion and an enlarged head portion; the capture portion including a longitudinal aperture for receiving the shank portion of the attachment formation; and an attachment portion for attaching a lifting hook to the device; wherein, with the lifting hook attached, the lifting hook obstructs the removal of the attachment formation from the capture portion.

In a sixth aspect there is provided a method of affixing a lifting device according to the fifth aspect of the invention to an attachment formation of a lifter bar, the attachment formation including a shank portion and an enlarged head portion, the method including the steps of: introducing the shank portion of the attachment formation into the longitudinal aperture of the lifting device with the lifting device in a substantially horizontal orientation; sliding the lifting device with respect to the attachment formation so that the lifting formation travels along the longitudinal aperture; rotating the lifting device to a substantially vertical orientation; and attaching a lifting hook to the lifting portion of the lifting device.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

An embodiment will now be described, by way of example only, with reference to the accompanying drawings, in which.

DETAILED DESCRIPTION OF EMBODIMENTS

Figure 1:
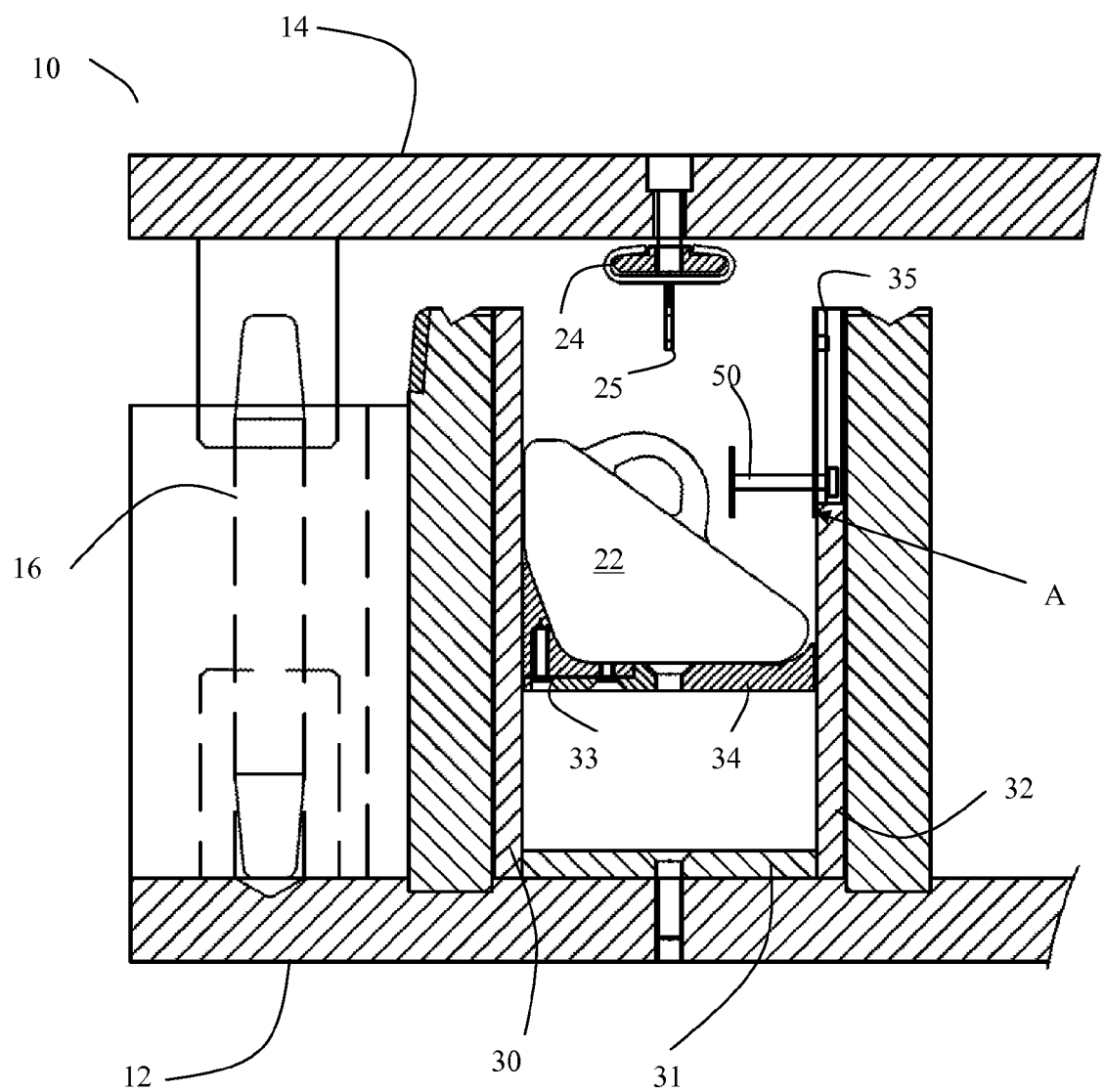
FIG. 1 is a cross-sectional view of a mould used in production of a lifter bar.

Referring to FIG. 1, a mould 10 is shown having a lower box section 12 and an upper lid section 14. The lid 14 may be raised and lowered under action of one or more hydraulic rams 16 to exert pressure on the contents of the mould. The mould also includes a heating device (not shown) to heat and maintain the contents of the mould at a desired temperature.

A method of producing a lifter bar 20 using the mould 10 will now be described. The lifter bar 20 is formed from an elastomeric material, in which are embedded various components as will become apparent from the following description.

The mould 10 is prepared with inserts 30, 31, 32, 33 & 34 to define the outer dimensions of the lifter bar being produced. The insert 33 defines the profile of what will become the leading edge of the finished lifter bar, and an insert 34 defines the profile of what will become the trailing edge of the finished lifter bar, and also serve to support a number of castings 22 which are introduced into and spaced along the length of the mould 10. The castings 22 will form hardened inserts in the finished lifter bar.

A track 24 is positioned in the lid 14 of the mould 10. The track 24 will become embedded in the finished lifter bar and is used to retain the lifter bar 20 in position in use in a grinding mill in a known fashion. The track 24 includes a longitudinal spine 25 which serves to anchor the track 24 into the elastomeric material of the lifter bar 20 and to thus increase the strength of the finished mill liner of which the lifter bar 20 will form a part. A pair of slots 35 (only one visible) is provided in the insert 32. The slots 35 have a generally T-shaped cross section and are each identical to one another. Each slot 35 is dimensioned to receive an attachment formation in the form of a bracket 50.

Figures 2, 3:
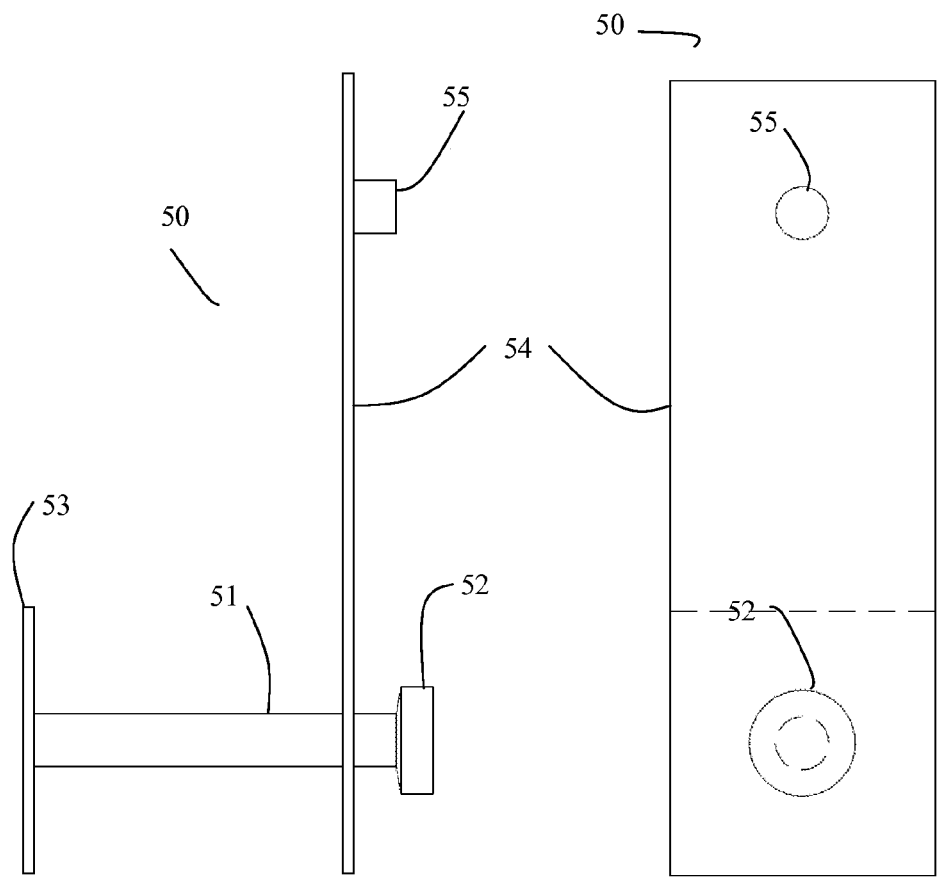
FIG. 2 is a side view of an attachment bracket.
FIG. 3 is a front view of the bracket of FIG. 2.
Figure 4:
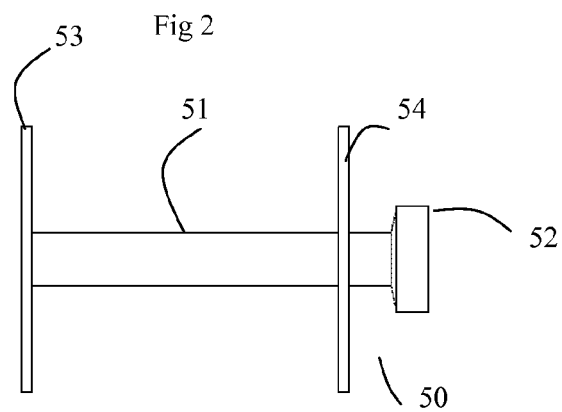
FIG. 4 is an end view of the bracket of FIG. 2.

Referring to FIGS. 2 to 4, the bracket 50 is shown in detail and includes a shank portion 51 and an enlarged head portion 52, both of which are circular in cross-section. An anchor portion in the form of an anchor plate 53 is affixed to one end of the shank portion 51. A sealing portion in the form of a sealing plate 54 is affixed to the shank portion 51 near to the head portion 52. A locating lug 55 is affixed to the sealing plate 54. The bracket 50 is formed from steel parts, welded together.

To introduce the bracket 50 into the T-profiled slot 35 of the mould 10, the head portion 52 is inserted into the slot 35, and the bracket is then allowed to drop down, so that the locating lug 55 also enters the slot 35, until the maximum depth of insertion is reached. Referring again to FIG. 1, it can be seen that the sealing plate 54 lies against the inside of the slot 35, and is prevented from rotating about the axis of the shank 51 by way of the locating lug 55 engaging with the slot 35. Furthermore, the bracket 50 is prevented from rotation in an anti-clockwise direction as shown in FIG. 1 due to the engagement of the head 52 inside the T-profile of the slot 35 and by abutment of the lower portion of the sealing portion 54 with the inside surface of the insert 32 indicated by arrow A in FIG. 1. During the subsequent moulding step described below, the sealing plate 54 inhibits the ingress of softened elastomeric material into slot 35.

With the castings 22, track 24 and brackets 50 in place, the remaining space inside the mould 10 is then filled with an elastomeric material. The mould is then closed and the contents of the mould subjected to heat and pressure for a period of time in a known manner to cure the elastomeric material. At the end of this period the mould is allowed to cool, the mould 10 is opened and the finished lifter bar 20 is ejected.

Figure 5:
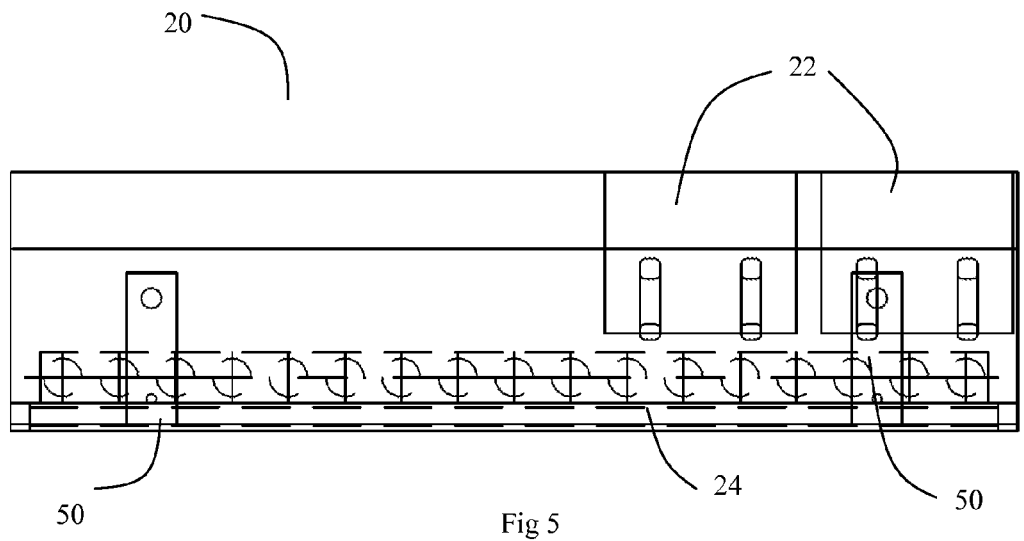
FIG. 5 is a rear view of a lifter bar ejected from the mould of FIG. 1 showing hidden detail.
Figure 6:
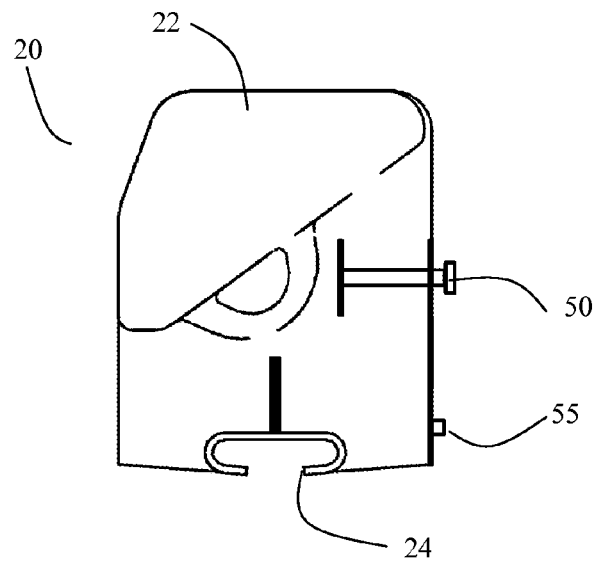
FIG. 6 is an end view of the lifter bar of FIG. 5, showing hidden detail.

Referring to FIGS. 5 and 6, the ejected lifter bar 20 is shown with the embedded components shown in outline. Two castings 22 are shown. In some embodiments the castings 22 may be provided along the entire length of lifter bar 20. To finish the lifter bar, the projecting locating lugs 55 are ground off.

The brackets 50 secure to the lifter bar in both a physical manner, in that elastomeric material of the lifter bar must be significantly disrupted in order to pull the brackets out of the bar, and also in a chemical manner in that the surfaces of the bracket become chemically bonded to the elastomeric material during the moulding process. The anchor plate 53 particularly enhances the physical securement of the bracket to the lifter bar 20. The result is that the brackets 50 are very securely attached to the lifter bar and can be used as attachment points to hoist the lifter bar, which may weigh upwards of 200 kg.

Figure 7:
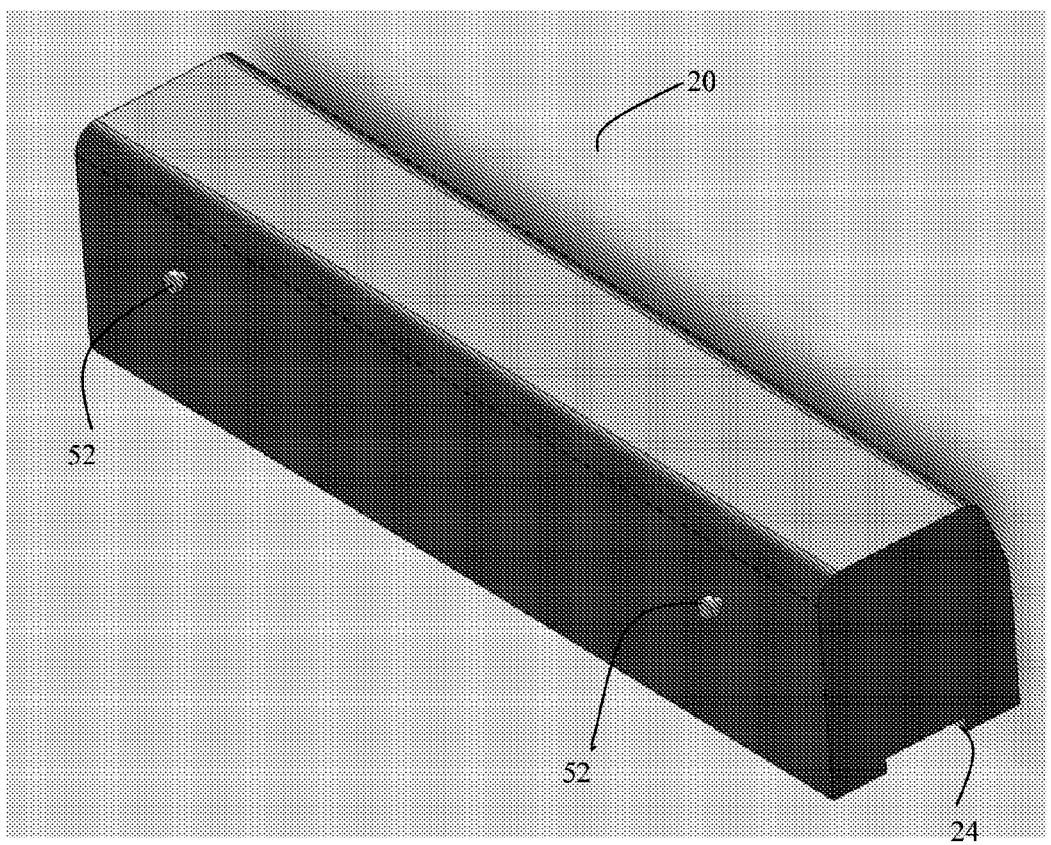
FIG. 7 is a perspective rear view of a finished lifter bar.

A finished lifter bar 20 is shown at FIG. 7 with protruding attachment formations being the head portions 52 of the brackets 50 spaced along the length of the lifter bar at the trailing face of the lifter bar. Two brackets 50 have been embedded into the bar 20 to provide two attachment portions that are spaced on either side of the centre of gravity of the bar 20.

Figure 8:
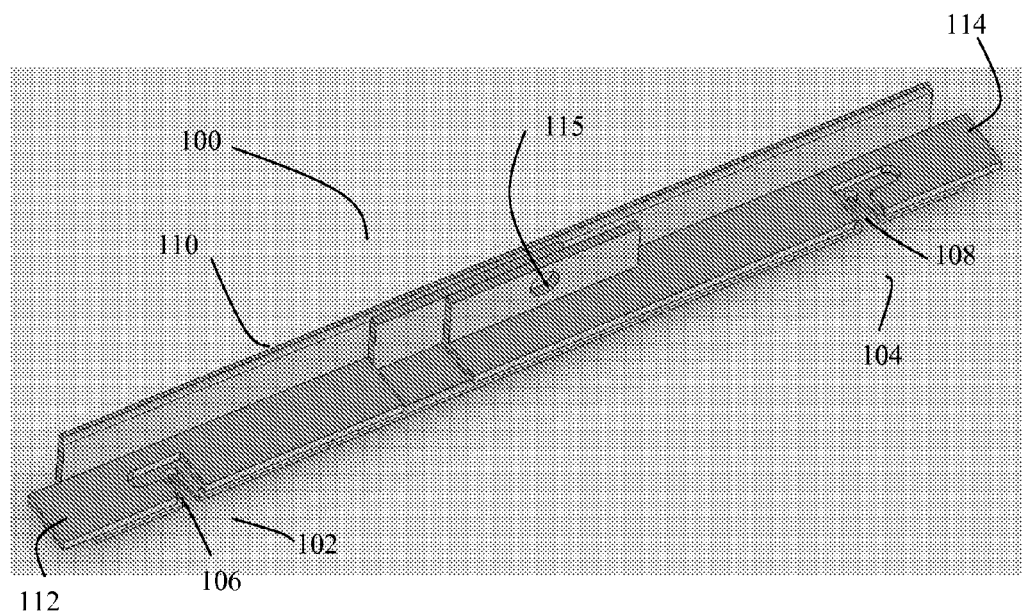
FIG. 8 shows a tool for use in hoisting the lifter bar of FIG. 7 in the open position.
Figure 9:
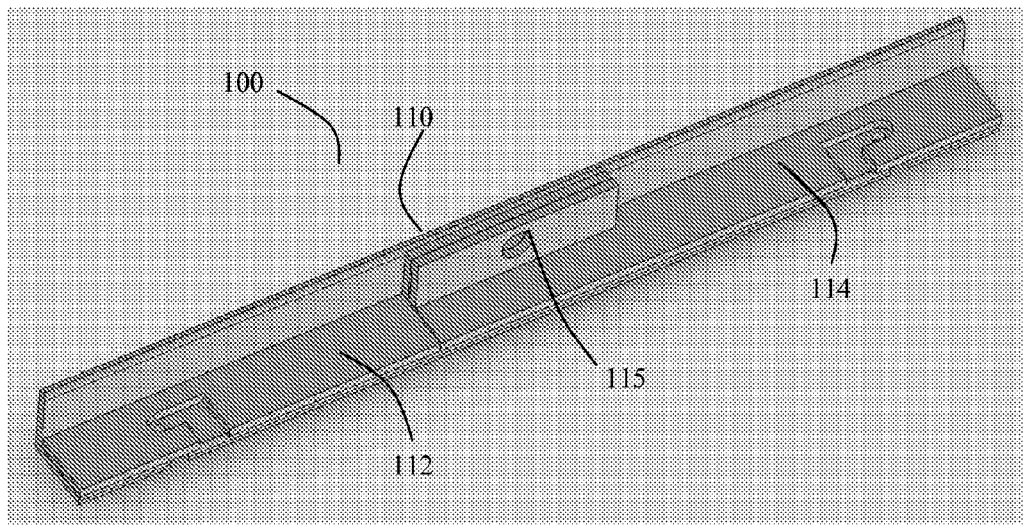
FIG. 9 shows the tool of FIG. 8 in the closed position.

Referring to FIGS. 8 and 9, a special tool 100 is shown which is used to attach to the lifter bar 20 to hoist the lifter bar, such as when installing or removing the lifter bar from a grinding mill. The tool 100 includes two capture mechanisms 102, 104, which operate to affix the tool 100 to the lifter bar 20 by fitting about the shank portions 51 of the brackets 50 that are embedded in bar 20 and thus can be used to hoist the lifter bar 20 by way of the bracket head portions 52.

The tool 100 includes a first member in the form of a strut 110 which is formed from a length of 90 degree angle iron, and to which are slidably attached second members 112, 114 which are moveable between open and closed positions. Each of the capture mechanisms 102, 104 are formed by a combination of strut 110 and the second members 112, 114 respectively. The strut 110 includes openings 106, 108 which are spaced apart to correspond with the locations of the exposed head portions 52 of the lifter bar 20 and are dimensioned to receive the shank portions 51 of the brackets 50. With the shank portions 51 located in each of the openings 106, 108, the second members are moved to their closed positions shown in FIG. 9, thereby trapping the shank portions 51 in the openings 106, 108.

Figure 10:
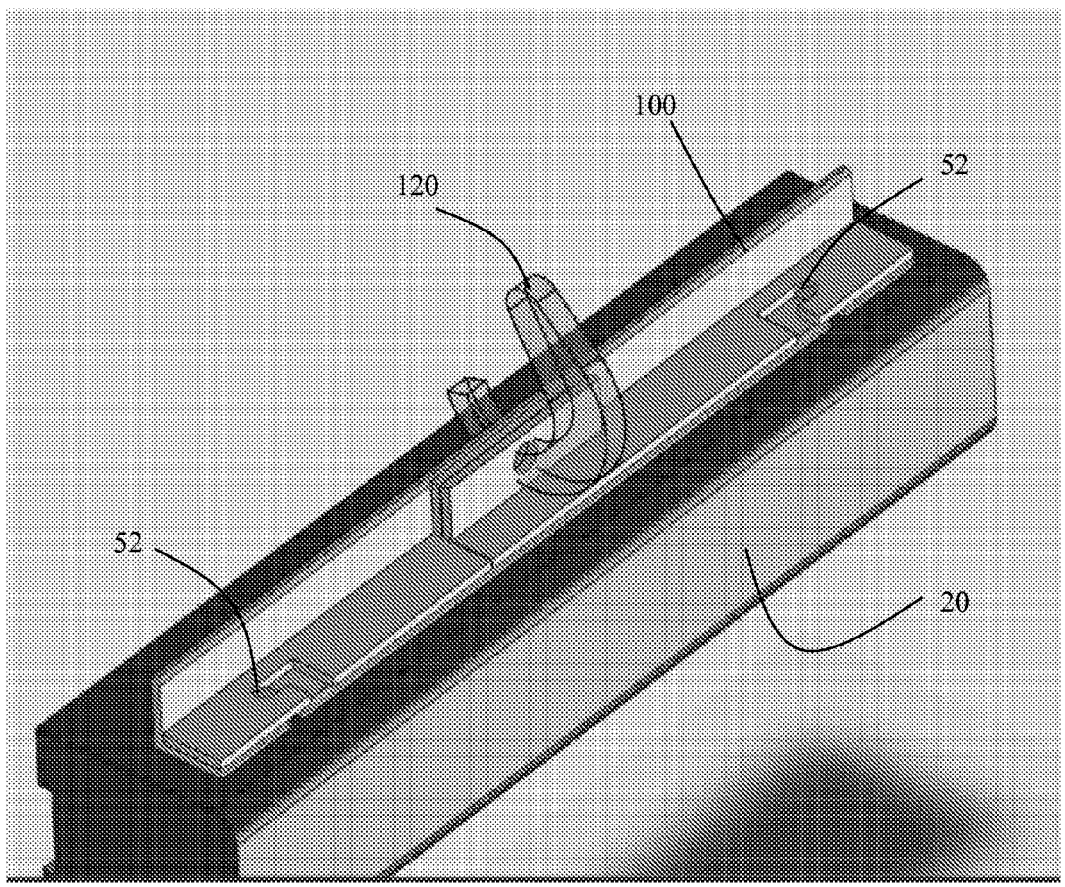
FIG. 10 shows the tool of FIGS. 8 and 9 attached to the lifter bar of FIG. 7, with a lifting hook in place for hoisting the lifter bar.

Each of the second members 112, 114 include locking formations in the form of apertures 113 (not visible) associated with member 112, and aperture 115 associated with member 114. A corresponding aperture 116 (also not visible) is provided in the strut 110. When the members 112, 114 are in their closed positions as shown at FIG. 9, the apertures 113, 115 and 116 line up. Referring to FIG. 10, with the apertures aligned, a lifting hook 120 can be passed through all three of these apertures 113, 115 and 116. Thus, the hook prevents the members 112, 114 from moving with respect to the strut 110 and so prevents release of the shanks 51 of the exposed portions of the brackets 50 of the lifter bar 20. Therefore, it is impossible for the lifter bar to become released from the tool while the tool and lifter bar are hoisted by the hook. This is an important safety feature of the tool 100.

The lifting hook is carried on a front end loader or similar mechanised hoist or lifting device, preferably mounted on powered wheels, to carry out the operations of introducing and removing the lifter bars to and from a grinding mill.

In the embodiment described above the lifter bar included a number of hardened inserts in the form of castings 22. For some applications, the castings may be omitted.

Referring now to FIGS. 11 to 16, an alternative embodiment of a bracket and lifting tool are shown.

Figure 11:
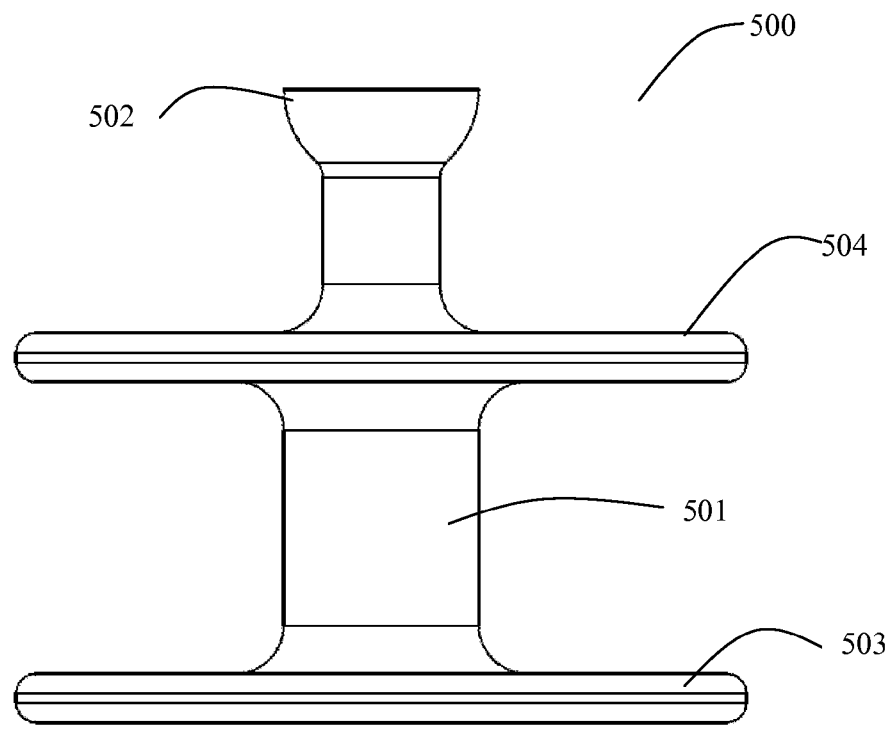
FIG. 11 is a side view of an alternative embodiment of a bracket.
Figure 12:
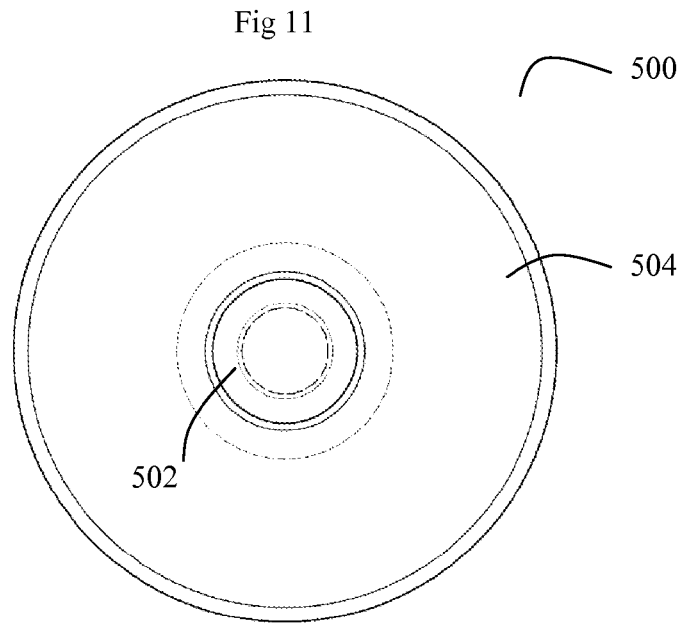
FIG. 12 is a top view of the bracket of FIG. 11.

Referring to FIGS. 11 and 12, a bracket 500 is shown including a shank portion 501, an enlarged head portion 502, a head shank portion 506 and both upper and lower anchor plates 504, 503. The bracket 500 can be formed by casting, forging, or machining, followed by an optional heat treatment process such as case hardening. Significantly, the lower surface of the enlarged head portion 502 is partly spherical in shape.

Figure 13:
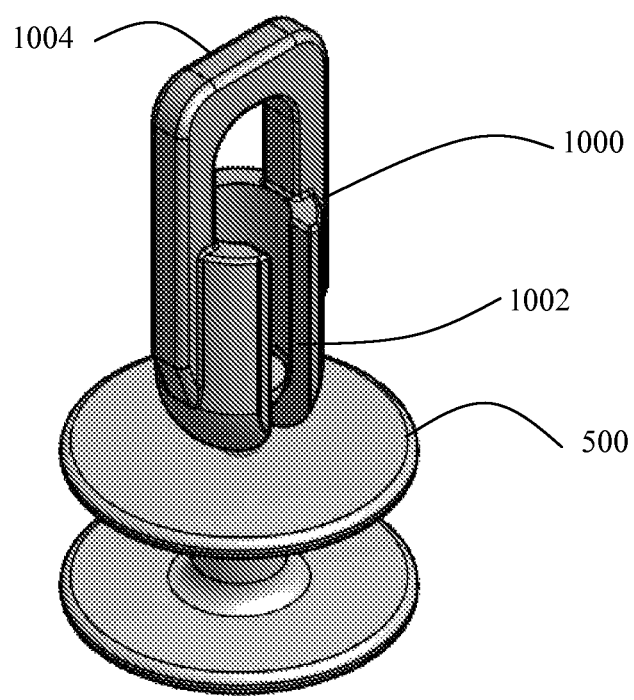
FIG. 13 shows the bracket of FIG. 11 attached to a lifting device.

Referring to FIG. 13, the bracket 500 is shown attached to a lifting device 1000 which includes a lifting portion 1004 for attaching to a lifting hook and a capture portion in the form of a longitudinal aperture 1002. In order to attach the lifting device 1000 to the bracket 500, the lifting device is held in a horizontal orientation so that the head shank portion 502 of the bracket 500 enters the upper end of the aperture 1002 with the enlarged head portion 502 inside the cavity in the lifting device. The lifting device is then moved in a horizontal fashion so that the lifting formation travels along the longitudinal aperture. When the head shank portion is located near to the bottom end of the aperture 1002, the lifting device 1000 is rotated to a vertical orientation as shown in FIG. 13 with the enlarged head portion 502 trapped inside the lifting device. A lifting hook or the like is then attached to the lifting portion 1004 of the lifting device. The presence of the lifting hook obstructs the removal of the enlarged head portion 502 from the lifting device. Therefore, the lifting device 1000 cannot be inadvertently separated from the lifter bar when in use in a lifting operation.

Figure 14:
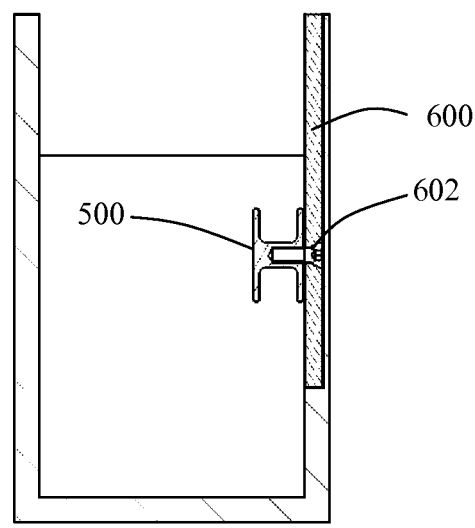
FIG. 14 illustrates preparation of a mould with the bracket of FIG. 11.

Referring to FIG. 14, a mould is shown for use in forming a lifter bar. A groove is machined into the wall of the mould to receive a bar 600 which includes an aperture for receiving the enlarged head portion of the bracket 500. The bar 600 thereby serves to maintain the bracket 500 in the correct position for moulding.

Figure 15:
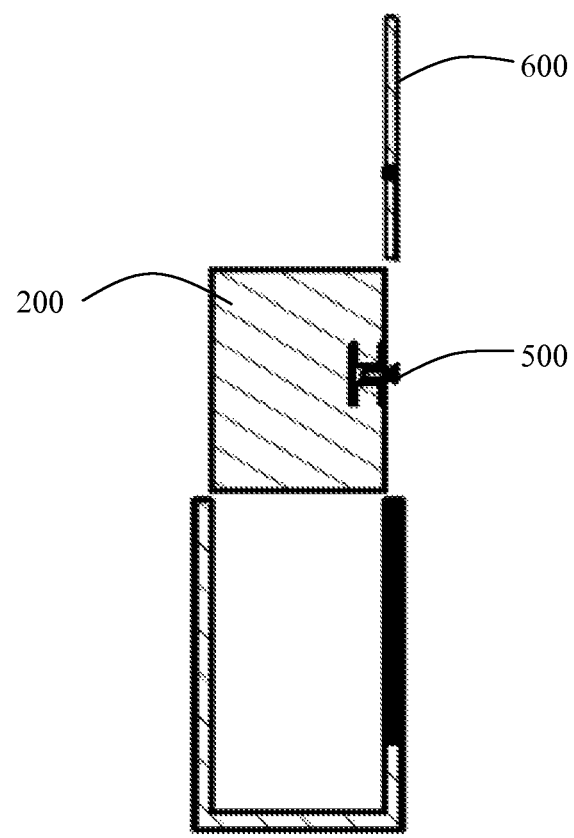
FIG. 15 shows removal of a moulded lifter bar from the mould.

Referring to FIG. 15, a lifter bar 200 has been formed by introducing elastomeric material into the mould and then curing it under action of heat and pressure. The lifter bar 200 is shown being removed from the mould. The bar 600 is set aside for subsequent re-use. The bracket 500 is now embedded in the lifter bar 200.

Figure 16:
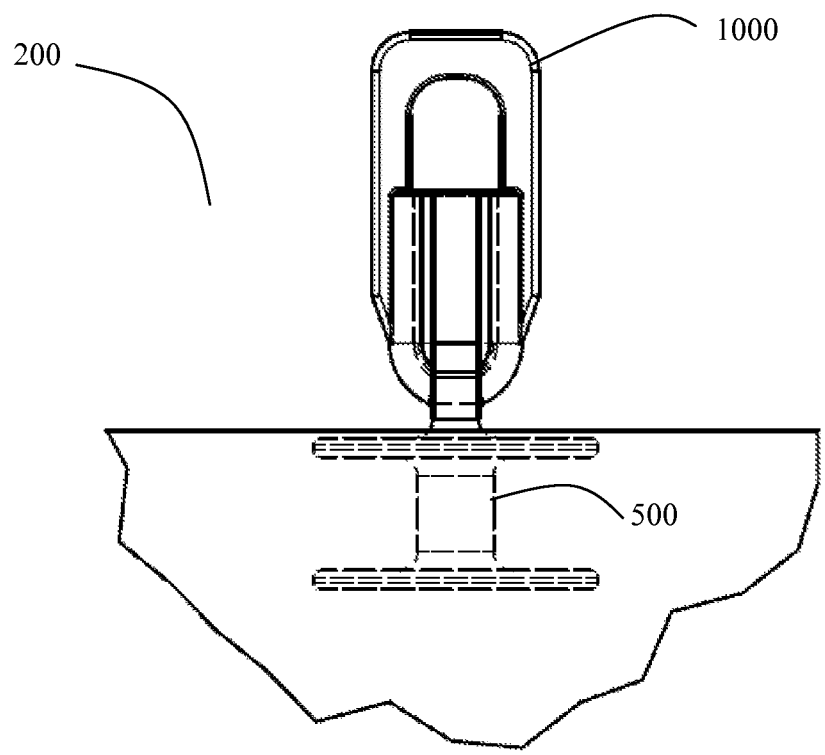
FIG. 16 is a detail view of lifting device 1000 being used to lift a lifter bar.

Referring to FIG. 16, lifting device 1000 is shown attached to the bracket 500 which is embedded in the lifter bar 200.

In the embodiments described above, the lifter bars featured at least two attachment formations spaced along the length of the lifter bar. Alternatively, one attachment formation could be provided at a location along the length of the lifter bar which coincides with the centre of mass of the lifter bar. A lifter bar fitted with an attachment formation in this way can be lifted using the single attachment formation and will balance to remain in an approximately horizontal orientation to allow maneouvering of the lifter bar into the end opening of a grinding mill. In the embodiments described above, this modification is achieved by configuring the mould to receive a single attachment formation at a location approximately at the mid-point along the length of the lifter bar.

It can be seen that the embodiments disclosed have at least one or more of the following advantages:

Attachment points are provided on a lifter bar, thus allowing for safe and easier handling of the lifter bar.

Attachment points are spaced on either side of the centre of gravity of the lifter bar, improving stability of the bar when it is hoisted.

The combination of the lifting tool and lifter bar assembly has a very low vertical height and enables mechanised loading of lifter bars into and out of grinding mills with small openings.

The locking function of lifting tool or lifting device prevents release of lifter bar until the lifting hook is removed, thus improving safety.

Any reference to prior art contained herein is not to be taken as an admission that the information is common general knowledge, unless otherwise indicated.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "upper" and "lower" and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A lifter bar including:
a body having a centre of gravity;
at least one attachment formation for use in lifting the lifter bar;
wherein the at least one attachment formation is embedded at least partially in a portion of the body of the lifter bar, and;
wherein the at least one attachment formation includes a shank portion that is at least partially embedded in the body, and an enlarged head portion having a bottom portion positioned adjacent the shank portion, and operable to engage an apparatus for use in lifting the lifter bar at the bottom portion of the enlarged head portion.

2. A lifter bar according to claim 1, wherein at least one attachment formation of the lifter bar includes at least a first attachment formation and a second attachment formation, and wherein the first attachment formation is positioned on one side of the centre of gravity of the lifter bar, and the second attachment formation is positioned on an opposite side of the centre of gravity of the lifter bar.

3. A lifter bar according to claim 1, wherein the at least one attachment formation is provided at a point along a length of the lifter bar that coincides with the centre of gravity of the lifter bar.

4. A lifter bar according to claim 1, wherein the enlarged head portion extends radially beyond the shank portion substantially about the entire circumference of the shank portion.

5. A lifter bar according to claim 1, wherein the at least one attachment formation further includes at least one anchor portion adjacent the shank portion.

6. A lifter bar according to claim 5, wherein the anchor portion includes a generally planar portion that lies in a plane substantially orthogonal to the axis of the shank portion.

7. A lifter bar according to claim 1, wherein the at least one attachment formation is disposed on a trailing face of the lifter bar.

8. A method for producing a lifter bar, the method comprising:
preparing a mould for forming the lifter bar;
introducing an elastomeric material into the mould;
introducing at least one attachment formation into the mould, wherein the at least one attachment formation includes a shank portion and an enlarged head portion having a bottom portion positioned adjacent the shank portion and operable to engage an apparatus for use in lifting the lifter bar at the bottom portion of the enlarged head portion; and
curing the elastomeric material to form the lifter bar.

9. A method according to claim 8, further comprising:
providing an opening in the mould to receive a portion of the attachment formation to locate the attachment formation in a desired position during production of the lifter bar.

10. A method according to claim 9, wherein the attachment formation includes a sealing portion that cooperates with the opening in the mould to inhibit the ingress of elastomeric material into the opening during production of the lifter bar.

11. A method according to claim 10, wherein the attachment formation includes a locating lug that cooperates with the opening to retain the sealing portion of the attachment formation in cooperation with the opening during production of the lifter bar.

* * * * *